United States Patent
Tanioka

(10) Patent No.: US 6,845,689 B2
(45) Date of Patent: Jan. 25, 2005

(54) SILK HAT SHAPED WAVE GEAR DEVICE

(75) Inventor: Yoshihiro Tanioka, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/456,521

(22) Filed: Jun. 9, 2003

(65) Prior Publication Data

US 2003/0233909 A1 Dec. 25, 2003

(30) Foreign Application Priority Data

Jun. 21, 2002 (JP) ........................................ 2002-180969

(51) Int. Cl.⁷ .......................... F16H 33/00; F16H 35/00; F16H 37/00

(52) U.S. Cl. ....................................................... 74/640
(58) Field of Search .............................. 74/640; 475/162

(56) References Cited

U.S. PATENT DOCUMENTS 5,715,732 A * 2/1998 Takizawa et al. ............. 74/640
6,202,508 B1 * 3/2001 Takizawa ..................... 74/640

* cited by examiner

Primary Examiner—Tisha Lewis
(74) Attorney, Agent, or Firm—Burns, Doane, Swecker & Mathis, L.L.P.

(57) ABSTRACT

A flexible external gear of a silk hat shaped wave gear device has an annular body, external teeth formed on an outer circumferential portion of a first opening of the body, a circular diaphragm connected to a second opening portion of the body, and a circular boss connected to an outer circumferential end of the diaphragm. The shape of a connected portion of the diaphragm and the body is defined by a curved portion whose diameter decreases gradually from the diaphragm toward the body when viewed along a device axis. Since the body is wider on the diaphragm side, the wave generator 7 can be easily fitted into the flexible external gear from the diaphragm side.

6 Claims, 4 Drawing Sheets

SILK HAT SHAPED WAVE GEAR DEVICE

BACKGROUND OF THE INVENTION

1. Field of the Invention

The present invention relates to a silk hat shaped wave gear device in which a silk hat shaped flexible external gear is incorporated. More particularly, it relates to a silk hat shaped wave gear device in which the shape of a flexible external gear is improved in shape so that a wave generator can easily be incorporated into the flexible external gear.

2. Description of the Related Art

A wave gear device in which a flexible external gear has a silk hat shape as shown in FIGS. 1 and 2 is publicly known. In this specification, a wave gear device of this type is referred to as a silk hat shaped wave gear device.

As shown in FIGS. 1 and 2, a silk hat shaped wave gear device 11 includes a circular rigid internal gear 12, a silk hat shaped flexible external gear 13 disposed inside the rigid internal gear 12, and an elliptical wave generator 14 fitted into the flexible external gear 13.

The flexible external gear 13 has an annular body 22, a circular diaphragm 23 provided with an inner circumferential end portion 23a connected to a proximal opening of the body 22, and a thick circular boss 25 formed integrally on an outer circumferential end portion 23b of the diaphragm 23 so as to be connected thereto. External teeth 24 are formed integrally on an outer circumferential portion of the distal opening of the body 22 in a circumferential direction. The circular boss 25 is used to install the flexible external gear 13 to another member (not shown), and the body 22 and the diaphragm 23 are supported in a cantilever state by the boss 25.

The wave generator 14 includes a hollow hub 14a, an elliptical rigid cam plate 14b fitted on an outer circumference of the hollow hub 14a, and a ball bearing 14c fitted on an outer circumference of the rigid cam plate 14b. A portion of the body 22 where the external teeth 24 of the flexible external gear 13 are formed is deflected into an elliptical shape by the wave generator 14, whereby two external tooth portions located at both ends of a major axis of an ellipse are engaged with internal teeth 12a of the rigid internal gear 12. If the wave generator 14 rotates around a device axis 11a in this state, these engagement positions move in a circumferential direction. By this movement, a relative rotation is produced between the flexible external gear 13 and the rigid internal gear 12 according to a difference in the number of teeth between the external and internal gears. Therefore, for example, if the rigid internal gear 12 is fixed and the wave generator 14 is used as a high-speed rotation input element, the external gear 13 serves as a reduced-speed rotation output element, and a reduced-speed rotation output is obtained from the external gear 13.

In the silk hat shaped wave gear device 11 constructed as above, work of incorporating the wave generator 14 into the flexible external gear 13 is performed by inserting the wave generator 14 from an opening at a side where the external teeth 24 of the flexible external gear 13 are formed. However, it is necessary to insert the wave generator 14 having an elliptical contour into an external tooth forming portion of the flexible external gear 13 having a cylindrical shape, so that the assembling work is difficult to do. Although the body 22 has flexibility, the external tooth forming portion thereof is the most rigid portion in the body 22. Therefore, work of incorporating the wave generator 14 while the external tooth forming portion is deflected into an elliptical shape is troublesome and difficult.

SUMMARY OF THE INVENTION

In view of above, a main object of the present invention is to provide a silk hat shaped wave gear device in which a wave generator can be assembled to the gear device easily.

To achieve the above and other objects, the present invention provides a silk hat shaped wave gear device which comprises a circular rigid internal gear; a flexible external gear disposed inside the rigid internal gear; and a wave generator disposed inside the flexible external gear for flexing the external gear radially to engage partially with the internal gear and for moving engaged portions of these gears along a circumferential direction, wherein the flexible external gear has a silk hat shape which comprises an annular body, external teeth formed on an outer circumferential portion of a first opening of the body, a circular diaphragm connected to a second opening portion of the body, and a circular boss connected to an outer circumferential end of the diaphragm, and the wave generator is fitted in an inside position of the body where the external teeth are formed, and wherein the shape of a connected portion of the diaphragm and the body and/or that of the body is set so that the wave generator can easily be inserted into the body from the second opening of the body.

DETAILED DESCRIPTION OF THE PREFERRED EMBODIMENTS

Figure 1:
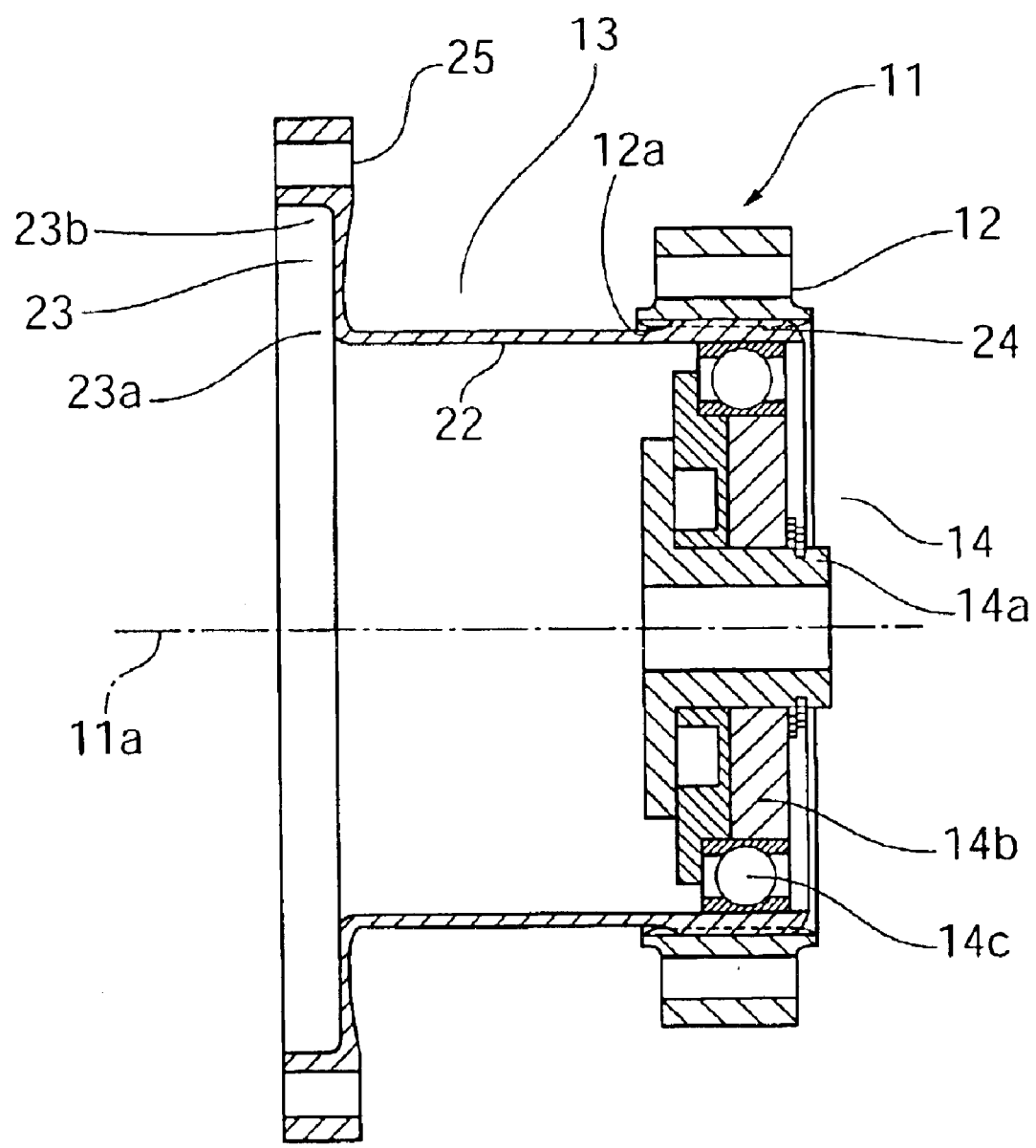
FIG. 1 is a sectional view including an axis, showing a conventional silk hat shaped wave gear device.
Figure 2:
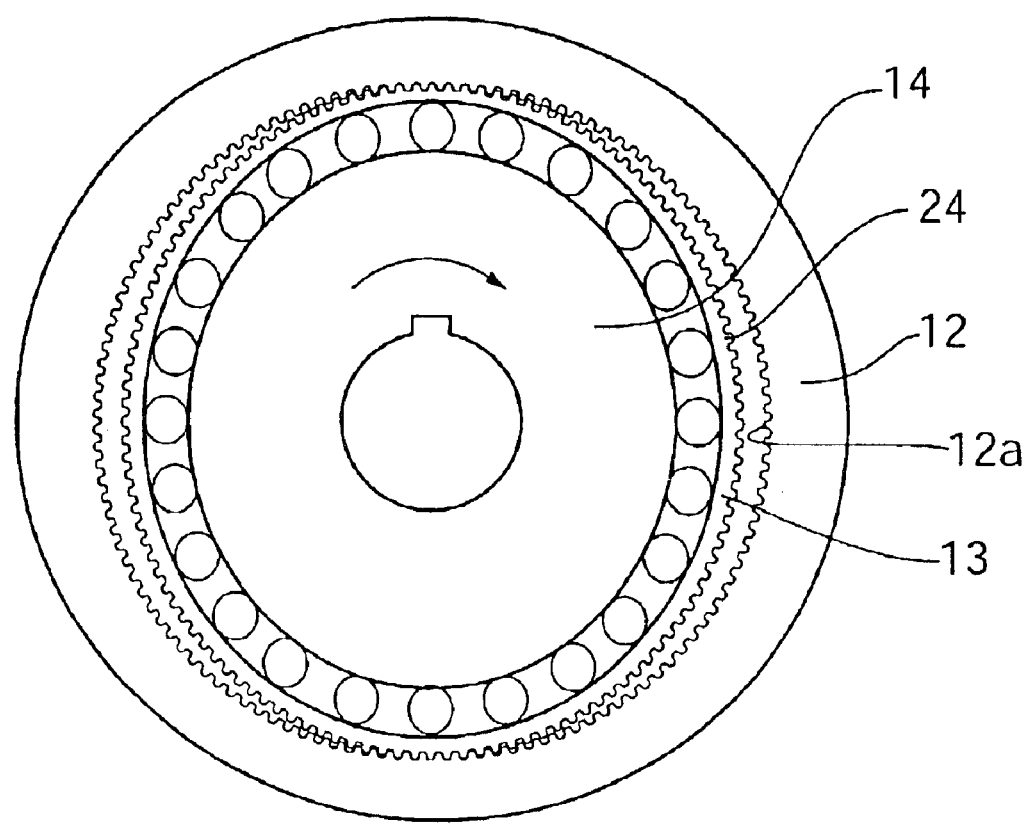
FIG. 2 is an explanatory view showing an engagement state of the silk hat shaped wave gear device of in FIG. 1.
Figure 3:
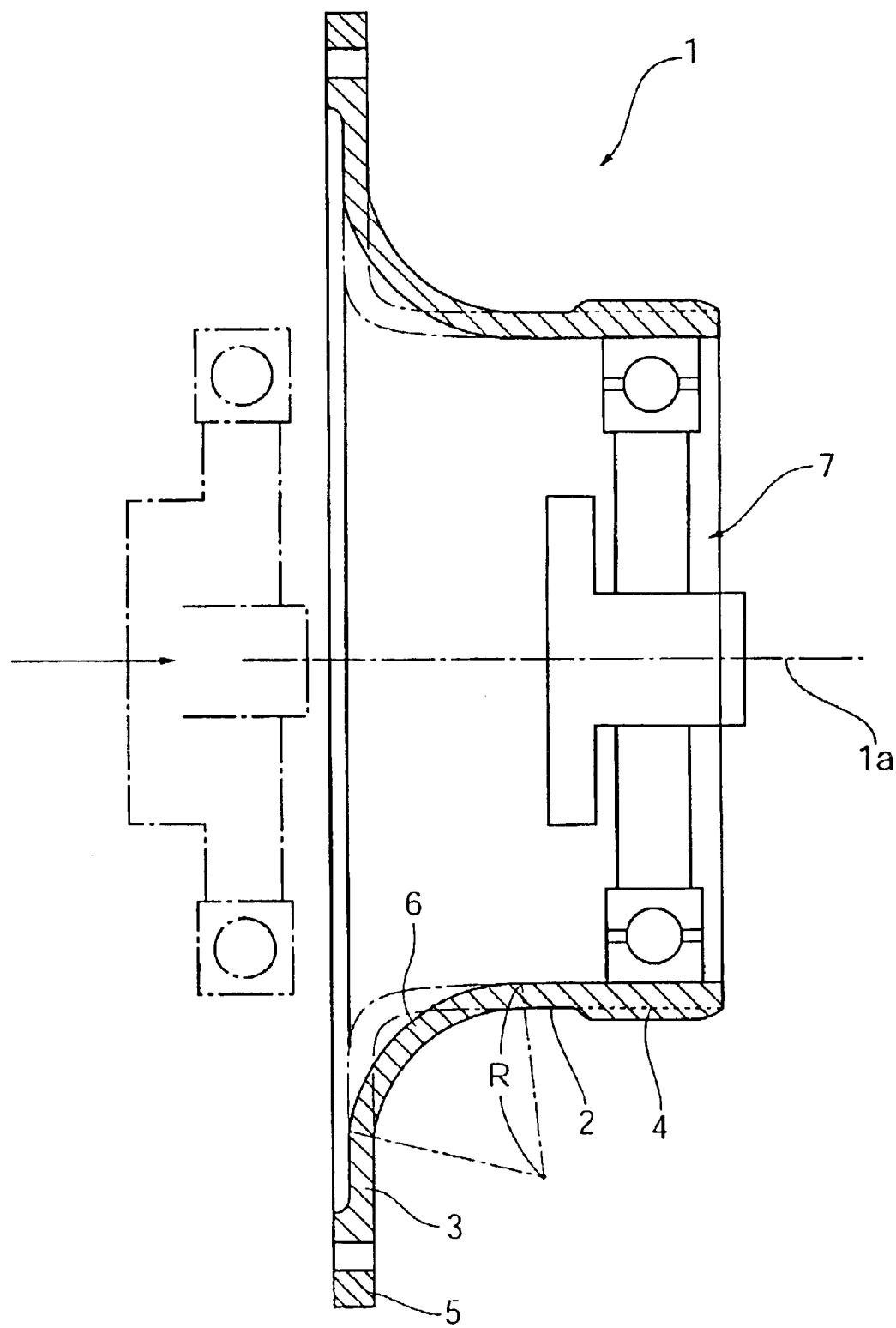
FIG. 3 is a sectional view including an axis, showing a flexible external gear to which the present invention is applied.

FIG. 3 shows a cross-sectional shape of a flexible external gear according to one embodiment of the present invention, when cut along a plane including an axis thereof. The flexible external gear 1 shown in FIG. 3 can be used in place of the flexible external gear 13 shown in FIGS. 1 and 2, and has an annular body 2, a circular diaphragm 3 connected to the proximal opening (second opening) side of the body 2, and a thick circular boss 5 formed integrally with an outer circumferential end portion of the diaphragm 3 so as to be connected thereto. On an outer circumferential portion of a distal opening (first opening) of the body 2, external teeth 4 are formed integrally along a circumferential direction.

The shape of a connected portion of the diaphragm 3 and the body 2 is defined by a curved portion 6, the diameter of which decreases gradually from the diaphragm 3 toward the body 2 when viewed along a device axis 1a. A radius of curvature R of the curved portion 6 is far larger than that of the corresponding portion of a conventional gear device shown in FIGS. 1 and 2. The imaginary line in FIG. 3 indicates the shape of the conventional flexible external gear 13 shown in FIGS. 1 and 2.

A wave generator 7 is incorporated into the flexible external gear 1 of this shape such that it is inserted from the diaphragm 3 side of the flexible external gear 1 as shown by an imaginary line in FIG. 3. Since the body 2 becomes wider toward the diaphragm 3, the wave generator 7 can be inserted easily. Therefore, the wave generator 7 can easily be fitted into the portion of the flexible external gear 1 where the external teeth 4 are formed.

Figure 4:
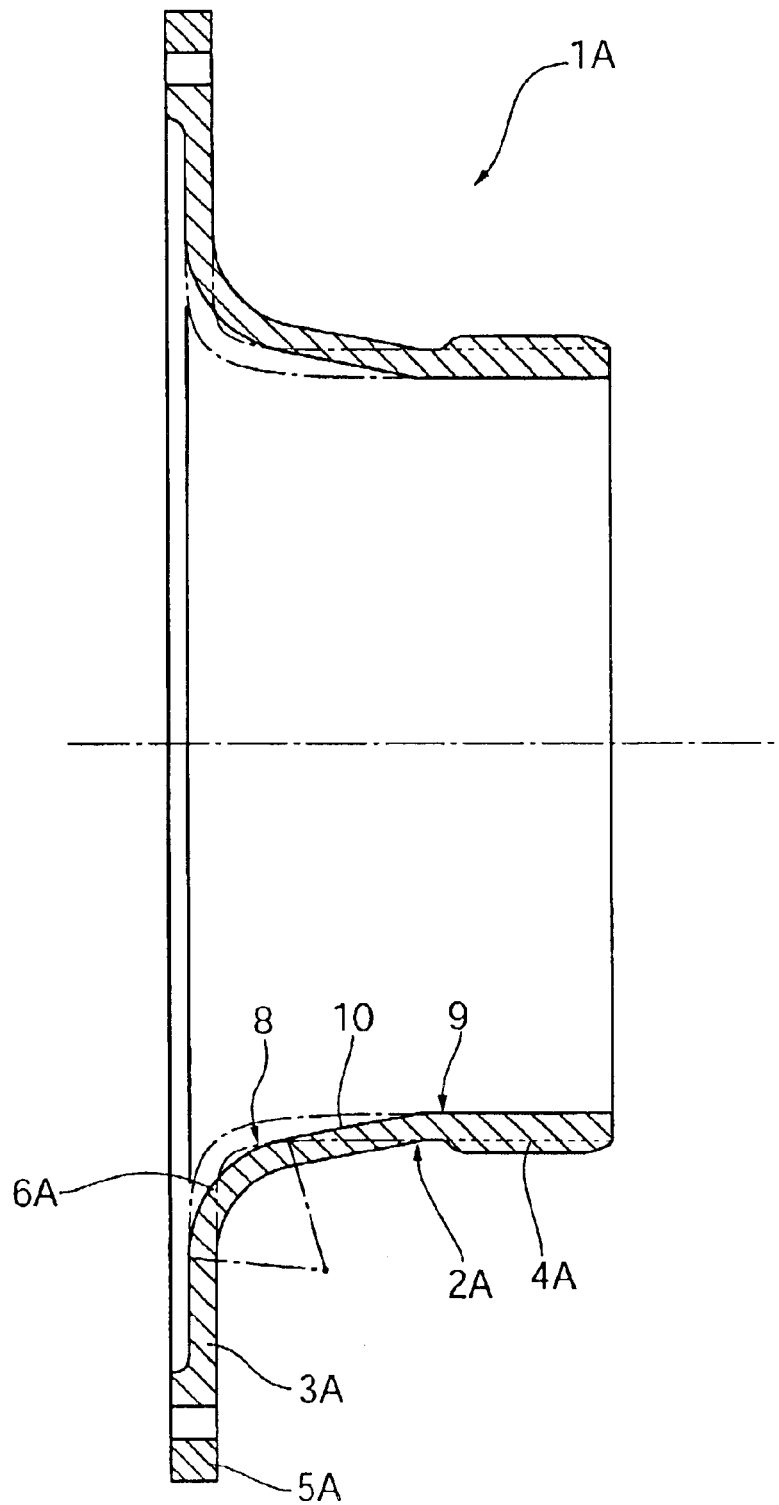
FIG. 4 is a sectional view including an axis, showing a flexible external gear to which the present invention is applied.

FIG. 4 shows across-sectional shape of a flexible external gear according to another embodiment of the present invention, when cut along a plane including an axis. The flexible external gear 1A shown in FIG. 4 can also be used in place of the flexible external gear 13 shown in FIGS. 1 and 2, and has an annular body 2A, a circular diaphragm 3A connected to a proximal opening (second opening) side of the body 2A, and a thick circular boss 5A formed integrally with an outer circumferential end portion of the diaphragm 3A so as to be connected thereto. On an outer circumferential portion of the distal opening (first opening) side of the body 2, external teeth 4A are formed integrally along a circumferential direction.

A portion of the second opening side of the body 2A is connected to the diaphragm 3A via a curved portion 6A with a small radius of curvature. Also, a tapered portion 10 is formed between a portion 8 smoothly connected to the curved portion 6A and a position 9 from which the external teeth 4A are formed. The diameter of the tapered portion 10 decreases gradually toward the external teeth 4A.

The wave generator 7 is also fitted into the flexible external gear 1A of this shape from the diaphragm 3A side of the flexible external gear 1A. Since the body 2A has the tapered portion 10 that is wider toward the diaphragm 3A, the wave generator 7 can be inserted easily from the diaphragm side. Therefore, the wave generator 7 can easily be inserted into the portion of the external teeth 4A where the external teeth 4A are formed.

As described above, in the silk hat shaped wave gear device in accordance with the present invention, the shape of the connected portion of the diaphragm and the body and/or that of the body in the flexible external gear is defined so that the wave generator can be easily fitted into the body from the diaphragm-side opening of the body.

Therefore, according to the present invention, the wave generator can be fitted into the flexible external gear very easily, compared to the conventional wave generator fitting work in which the wave generator is inserted into the flexible external gear from the opening end side where the external teeth thereof are formed.

What is claimed is:

1. A silk hat shaped wave gear device comprising:

a circular rigid internal gear;

a flexible external gear disposed inside the rigid internal gear;

and a wave generator disposed inside the flexible external gear for flexing the external gear radially to engage partially with the internal gear and for moving engaged portions of these gears along a circumferential direction, wherein the flexible external gear is of a silk hat shape which comprises an annular body, external teeth formed on an outer circumferential portion of a first opening of the body, a circular diaphragm connected to a second opening portion of the body, and a circular boss connected to an outer circumferential end of the diaphragm, and the wave generator is fitted into a portion of the body where the external teeth are formed, and wherein a shape of a connected portion of the diaphragm and the body is defined so that the wave generator can easily be inserted into the body from the second opening of the body.

2. The silk hat shaped wave gear device according to claim 1, wherein the shape of the connected portion of the diaphragm and the body is defined by a curved portion, a diameter of which decreases gradually from the diaphragm toward the body when viewed along a device axis, and a radius of curvature of the curved portion is larger than a predetermined value.

3. A silk hat shaped wave gear device comprising:

a circular rigid internal gear;

a flexible external gear disposed inside the rigid internal gear;

and a wave generator disposed inside the flexible external gear for flexing the external gear radially to engage partially with the internal gear and for moving engaged portions of these gears along a circumferential direction, wherein the flexible external gear is of a silk hat shape which comprises an annular body, external teeth formed on an outer circumferential portion of a first opening of the body, a circular diaphragm connected to a second opening portion of the body, and a circular boss connected to an outer circumferential end of the diaphragm, and the wave generator is fitted into a portion of the body where the external teeth are formed, and wherein a shape of the body is defined so that the wave generator can easily be inserted into the body from the second opening of the body.

4. The silk hat shaped wave gear device according to claim 3, wherein the body has a tapered portion formed between a side of the second opening of the body and a position from which the external teeth are formed, and the diameter of the tapered portion decreases gradually toward the external teeth.

5. A flexible external gear for a silk hat shaped wave gear device comprising a circular rigid internal gear arranged outside the flexible external gear and a wave generator disposed inside the flexible external gear for flexing the external gear radially to engage partially with the internal gear and for moving engaged portions of these gears along a circumferential direction, the flexible external gear comprising:

an annular body of a silk hat shape, external teeth formed on an outer circumferential portion of a first opening of the body, a circular diaphragm connected to a second opening portion of the body, and a circular boss connected to an outer circumferential end of the diaphragm;

wherein the wave generator is fitted into a portion of the body where the external teeth are formed, and a shape of a connected portion of the diaphragm and the body is defined so that the wave generator can easily be inserted into the body from the second opening of the body.

6. A flexible external gear for a silk hat shaped wave gear device comprising:

a circular rigid internal gear arranged outside the flexible external gear and a wave generator disposed inside the flexible external gear for flexing the external gear radially to engage partially with the internal gear and for moving engaged portions of these gears along a circumferential direction, the flexible external gear comprising:

an annular body of a silk hat shape, external teeth formed on an outer circumferential portion of a first opening of the body, a circular diaphragm connected to a second opening portion of the body, and a circular boss connected to an outer circumferential end of the diaphragm;

wherein the wave generator is fitted into a portion of the body where the external teeth are formed, and a shape of the body is defined so that the wave generator can easily be inserted into the body from the second opening of the body.

* * * * *